(12) United States Patent
Degiorgis et al.

(10) Patent No.: US 9,334,062 B2
(45) Date of Patent: May 10, 2016

(54) ASSISTED IN-FLIGHT REFUELLING SYSTEM

(75) Inventors: Piero Giorgio Degiorgis, Monfalcone (IT); Valerio Manetti, Gorizia (IT)

(73) Assignee: SELEX GALILEO S.P.A., Campi Bisenzio (IT)

(*) Notice: Subject to any disclaimer, the term of this patent is extended or adjusted under 35 U.S.C. 154(b) by 366 days.

(21) Appl. No.: 12/792,440

(22) Filed: Jun. 2, 2010

(65) Prior Publication Data

US 2011/0001011 A1 Jan. 6, 2011

(30) Foreign Application Priority Data

Jun. 4, 2009 (IT) ............... TV2009A0116

(51) Int. Cl.
*B64D 39/00* (2006.01)
*B64D 39/06* (2006.01)
*G01S 19/18* (2010.01)
*G01S 19/51* (2010.01)
*G01S 19/54* (2010.01)

(52) U.S. Cl.
CPC ............. *B64D 39/06* (2013.01); *B64D 39/00* (2013.01); *G01S 19/18* (2013.01); *G01S 19/51* (2013.01); *G01S 19/54* (2013.01)

(58) Field of Classification Search
CPC ..................................................... B64D 39/00
USPC .......................................... 244/135 A, 135 R
See application file for complete search history.

(56) References Cited

U.S. PATENT DOCUMENTS

| | | | | |
|---|---|---|---|---|
| 3,285,544 A | * | 11/1966 | Chope et al. | 244/135 A |
| 4,025,193 A | * | 5/1977 | Pond et al. | 356/5.1 |
| 5,109,345 A | * | 4/1992 | Dabney et al. | 701/3 |
| 6,752,357 B2 | * | 6/2004 | Thal et al. | 244/135 A |
| 6,819,982 B2 | * | 11/2004 | Doane | 701/3 |
| 6,969,030 B1 | * | 11/2005 | Jones et al. | 244/172.5 |
| 7,686,252 B2 | * | 3/2010 | Mickley et al. | 244/135 A |
| 7,937,190 B2 | * | 5/2011 | Stecko et al. | 701/3 |
| 8,132,759 B2 | * | 3/2012 | Von Thal | 244/135 A |
| 2005/0114023 A1 | | 5/2005 | Williamson et al. | |

FOREIGN PATENT DOCUMENTS

| WO | WO-9106471 A1 | 5/1991 |
|---|---|---|
| WO | WO-9307055 A1 | 4/1993 |
| WO | WO-9807623 A1 | 2/1998 |
| WO | WO-0102875 A2 | 1/2001 |
| WO | WO-0224529 A1 | 3/2002 |

OTHER PUBLICATIONS

Partial European Search Report in European Patent Application No. EP10164829 dated Nov. 16, 2010.

* cited by examiner

*Primary Examiner* — Timothy D Collins
*Assistant Examiner* — Keith L Dixon
(74) *Attorney, Agent, or Firm* — Marshall, Gerstein & Borun LLP (57) ABSTRACT

An assisted in-flight refueling system having a tanker aircraft equipped with a drogue; a fuel take-on aircraft equipped with a probe; and a drogue-probe coupling assist system designed to determine a first distance between the drogue and the take-on aircraft/probe, a second distance between the tanker aircraft and the drogue, and a third distance between the tanker aircraft and the take-on aircraft. The drogue-probe coupling assist system is also designed to determine information relative to the necessary movement of the drogue and/or the necessary movement of the take-on aircraft to couple the drogue to the probe, as a function of the first, second, and third distance.

21 Claims, 7 Drawing Sheets

ASSISTED IN-FLIGHT REFUELLING SYSTEM

CROSS-REFERENCE TO RELATED APPLICATIONS

This application claims the benefit of Italian Patent Application No. TV2009A000116, filed Jun. 4, 2009.

The present invention relates to a hose-and-drogue in-flight refueling system.

BACKGROUND OF THE INVENTION

As is known, hose-and-drogue in-flight refueling systems comprise: a tanker aircraft equipped with a refueling hose fitted on its free end with a drogue; and a fuel take-on aircraft equipped with a rigid probe designed to connect to the drogue to allow the tanker aircraft to refuel the take-on aircraft.

The procedure adopted by conventional hose-and-drogue refueling systems substantially comprises: a tanker aircraft positioning step, in which the tanker aircraft follows a predetermined course, normally a straight line, at a constant speed of 200 to 350 knots, depending on the aircraft involved, so as to move as predictably as possible; an approach or docking step, in which the pilot of the take-on aircraft moves the aircraft into a receiving zone to dock with the tanker aircraft; a drogue-probe coupling step, in which the pilot of the take-on aircraft controls the aircraft manually to align the probe with the drogue and move the aircraft into position to connect the probe to the drogue; a refueling step, in which fuel is transferred from the tanker aircraft to the take-on aircraft via the refueling circuit, in particular the drogue-probe; and a drogue-probe release step.

The above procedure involves numerous technical problems.

Firstly, successful drogue-probe coupling, and the time taken to do it, depend on various factors, such as: weather conditions; visibility; and the stress level and skill of the pilots of the take-on aircraft in performing the manual docking/coupling manoeuvre.

Secondly, drogue-probe coupling is only successful when the relative speed of the two aircraft, over the last few seconds prior to coupling, ranges between 2 and 5 knots. In fact, below 2 knots, the probe cannot be connected to the drogue; whereas speeds of over 5 knots may result in hazardous docking of the tanker and take-on aircraft.

In refueling systems of the type described, drogue-probe coupling is therefore a critical operation which, in addition to the failure margins involved, is a source of severe stress on the pilots performing the manoeuvre, and does not allow for calculating refueling time, which obviously poses serious problems when a whole fleet has to be refueled within a maximum total time associated with the fuel range of the aircraft in the fleet.

SUMMARY OF THE INVENTION

It is an object of the present invention to provide an in-flight refueling system designed to eliminate the above drawbacks.

According to the present invention, there is provided an assisted in-flight refueling system as claimed in the attached Claims.

BRIEF DESCRIPTION OF THE DRAWINGS

A non-limiting embodiment of the present invention will be described by way of example with reference to the accompanying drawings, in which.

DETAILED DESCRIPTION OF THE INVENTION

Figure 1:
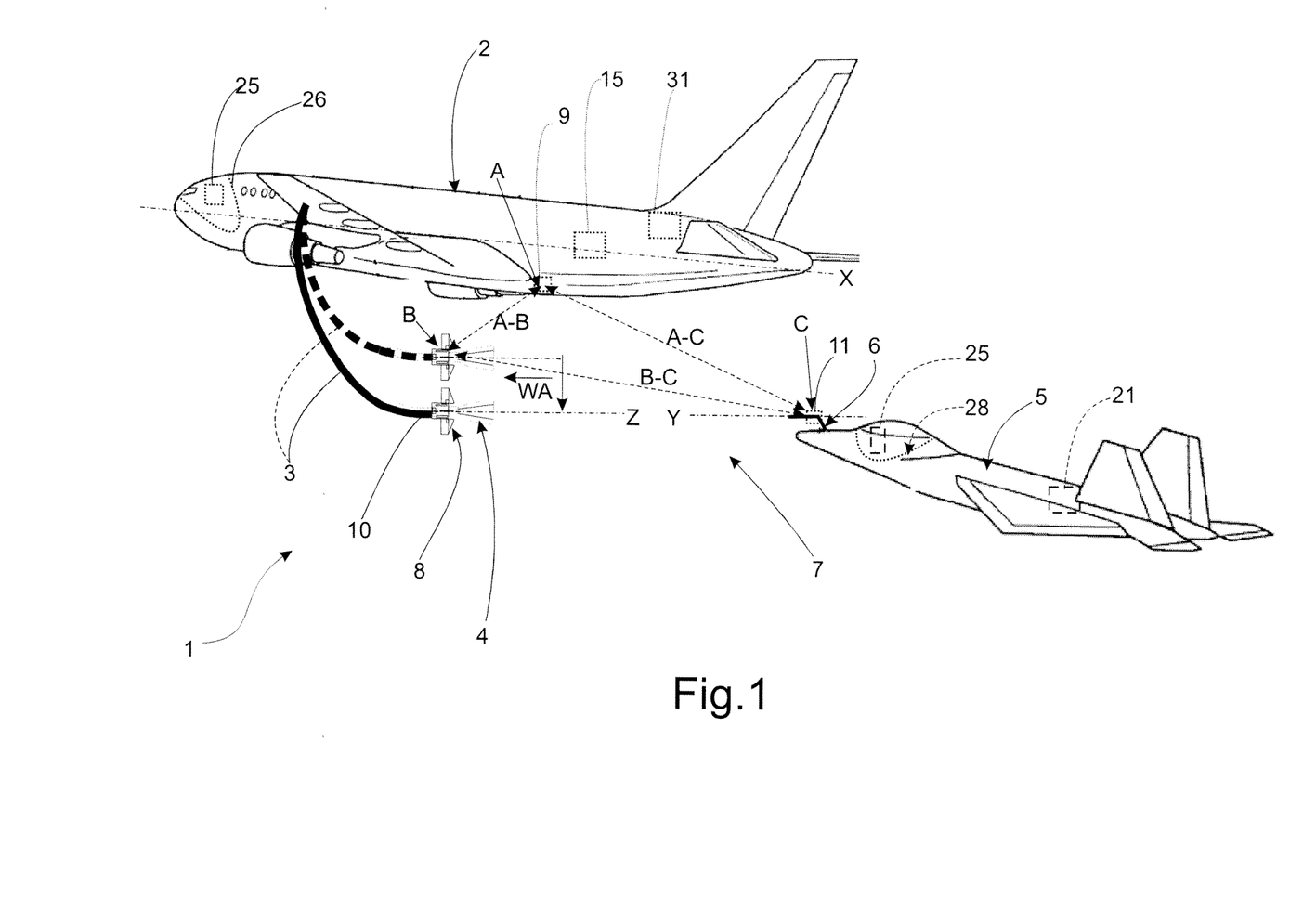
FIG. 1 shows a schematic of an assisted in-flight refueling system in accordance with the teachings of the present invention.

Number 1 in FIG. 1 indicates as a whole an assisted in-flight refueling system comprising a fuel tanker aircraft 2 equipped with a fuel hose 3, which extends from tanker aircraft 2 so that, in flight, an end portion of hose 3 is positioned substantially parallel to the longitudinal axis X of tanker aircraft 2, and is connected at its free end to a drogue 4.

Assisted in-flight refueling system 1 also comprises a fuel take-on aircraft 5 equipped with a rigid probe 6, which preferably, though not necessarily, projects along a longitudinal axis Z from the front of the fuselage of take-on aircraft 5, and is shaped to couple with drogue 4 to allow tanker aircraft 2 to supply take-on aircraft 5 with the required amount of fuel.

Figure 2:
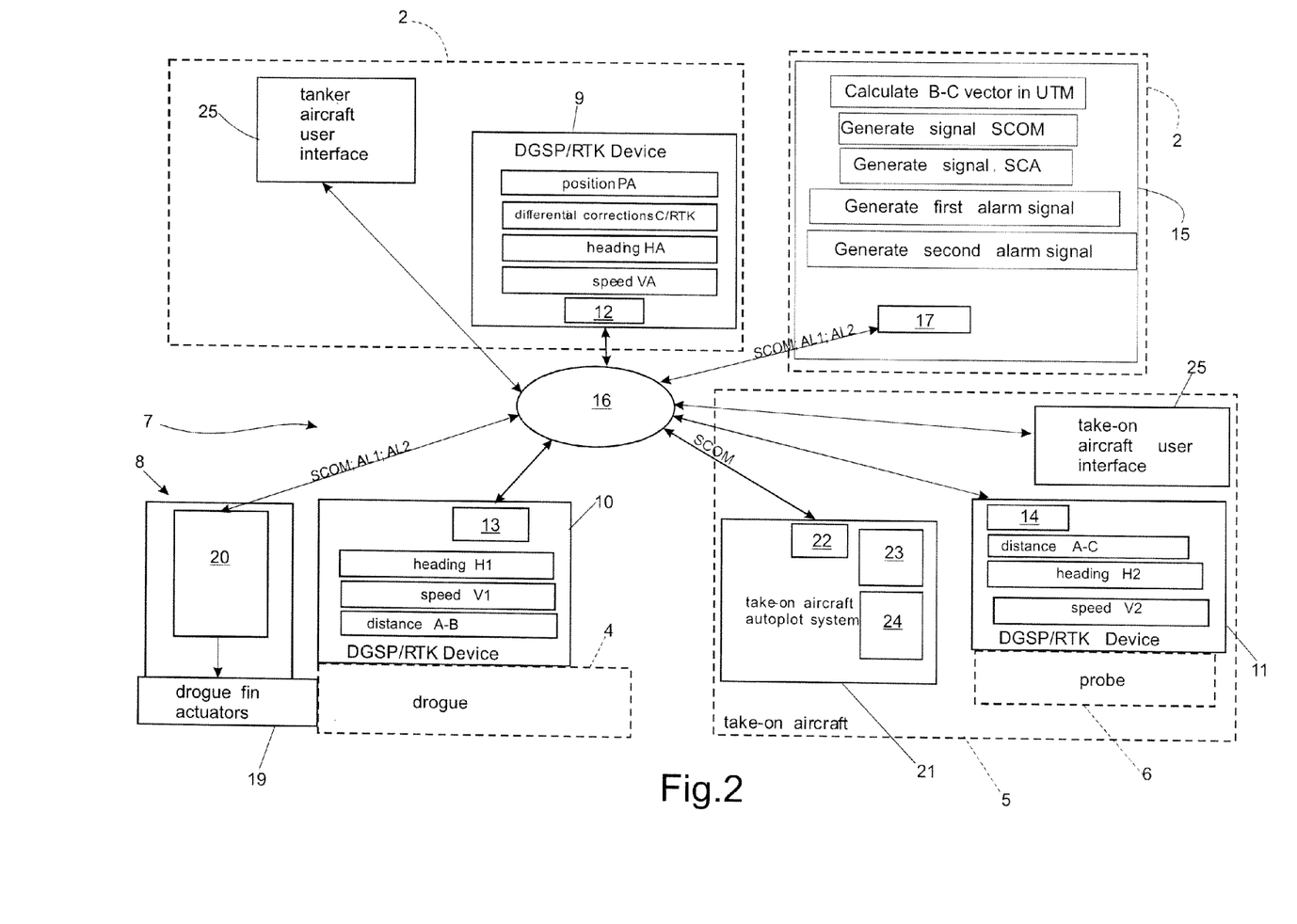
FIG. 2 shows a schematic of a drogue-probe coupling assist system forming part of the assisted in-flight refueling system in FIG. 1.

In the FIGS. 1 and 2 example, refueling system 1 comprises a drogue-probe coupling assist system 7 configured to determine a distance between drogue 4 and probe 6; a distance between tanker aircraft 2 and drogue 4; a distance between tanker aircraft 2 and take-on aircraft 5; and the displacement of drogue 4 and/or of take-on aircraft 5 necessary to achieve drogue-probe coupling, as a function of the three distances.

In the FIG. 1 example, drogue-probe coupling assist system 7 comprises three positioning modules, one fitted to tanker aircraft 2, one inside drogue 4, and one fitted to aircraft 5, preferably though not necessarily at probe 6.

In the FIG. 1 embodiment, one of the three positioning modules comprises a differential satellite positioning master module 9 configured to determine its own absolute position; and the other two positioning modules comprise respective differential satellite positioning slave modules 10, 11, each configured to determine its own distance with respect to differential satellite positioning master module 9.

In the example shown, differential satellite positioning master module 9 is designed to determine and transmit its own instantaneous absolute position PA and a differential correction C-RTK (both described in detail below); and each differential satellite positioning slave module 10, 11 is designed to receive absolute position PA and differential correction C-RTK, and accordingly determine its own distance with respect to differential satellite positioning master module 9.

Drogue-probe coupling assist system 7 is also designed to control displacement of drogue 4 as a function of the distances determined by differential satellite positioning slave modules 10, 11.

Drogue-probe coupling assist system 7 also comprises a drogue control assembly 8, which is preferably, though not necessarily, fitted to the free end of hose 3 (as in the FIG. 3 example) or is integrated in drogue 4 (in a variation not shown), and provides for shifting drogue 4, on command, in one or more directions substantially crosswise to the hauling/travelling direction WA of drogue 4.

Differential satellite positioning master module 9 comprises a DGPS/RTK (Differential Global Positioning System/Real Time Kinematic) satellite positioning device designed to continuously determine: its own absolute position PA in space in terms of latitude, longitude, and altitude; its own travelling speed VA; and its own heading angle HA.

In connection with the above, it should be pointed out that, in the FIG. 1 example, absolute position PA, speed VA, and heading angle HA measured by the DGPS/RTK satellite positioning device are associated with tanker aircraft 2.

The DGPS/RTK satellite positioning device of differential satellite positioning master module 9 implements an RTK (Real Time Kinematic) algorithm, which determines the differential correction C-RTK to be made to the GPS satellite system measurement.

The RTK algorithm implemented by the DGPS/RTK satellite positioning device of differential satellite positioning master module 9 is known and therefore not described in detail, except to state that the differential correction C-RTK corresponds to the corrections to be made to the CPM (Carrier Phase Measurement) of the satellite signal employed by the DGPS/RTK satellite positioning device to calculate absolute position PA.

It should also be pointed out that the DGPS/RTK satellite positioning device of differential satellite positioning master module 9 is conveniently designed, as explained in detail below, to determine its own position PA and correction C-RTK by means of a computing algorithm suitable for a mobile, as opposed to stationary, positioning base. In the solution proposed, in fact, the DGPS/RTK satellite positioning device is mounted on a moving object, corresponding in this case to tanker aircraft 2, no differential satellite positioning master module 9 is designed to implement a computing algorithm capable of taking into account the movement of the object on which it is installed.

Differential satellite positioning master module 9 is also designed to transmit absolute position PA, speed VA, heading angle HA, and differential correction C-RTK by means of a transceiver module 12.

The differential satellite positioning slave module 10 in drogue 4 comprises a DGPS/RTK satellite positioning device (not shown) designed to receive absolute position PA, speed VA, heading angle HA, and differential correction C-RTK by means of a transceiver module 13.

As explained below, differential satellite positioning slave module 10 is designed to determine its own position with respect to absolute position PA of differential satellite positioning master module 9.

In the example shown, differential satellite positioning slave module 10 is designed to determine its own distance A-B with respect to differential satellite positioning slave module 9 on the basis of absolute position PA and the differential correction C-RTK processed by differential satellite positioning master module 9.

Accordingly, differential satellite positioning slave module 10 comprises a computing unit (not shown), which receives the relative position determined by the DGPS/RTK satellite positioning device, and the absolute position PA and differential correction C-RTK transmitted by differential satellite positioning master module 9, and accordingly determines the distance A-B between differential satellite positioning master module 9 and differential satellite positioning slave module 10.

Differential satellite positioning slave module 10 is also designed to determine and transmit its own relative position; its own distance A-B corrected on the basis of differential correction C-RTK; its own speed V1; and its own heading angle H1. It should be pointed out that speed V1 and heading angle H1 correspond to the speed and heading angle of the object on which differential satellite positioning slave module 10 is installed, i.e. drogue 4.

Differential satellite positioning slave module 11, which, in the example shown, is located on aircraft 5, comprises a DGPS/RTK satellite positioning device designed to receive absolute position PA, speed VA, heading angle HA, and differential correction C-RTK by means of a transceiver module 14, and to determine its own position with respect to differential satellite positioning master module 9.

More specifically, as explained below, differential satellite positioning slave module 11 is designed to determine and transmit its own position and distance A-C with respect to differential satellite positioning master module 9 on the basis of absolute position PA and differential correction C-RTK.

Accordingly, differential satellite positioning slave module 11 comprises a computing unit (not shown), which receives the relative position determined by the DGPS/RTK satellite positioning device, and the absolute position PA and differential correction C-RTK transmitted by differential satellite positioning master module 9, and accordingly determines the distance A-C between differential satellite positioning master module 9 and differential satellite positioning slave module 11.

Differential satellite positioning slave module 11 is also designed to determine and transmit its own speed V2 and heading angle H2, which correspond to the speed and heading angle of probe 6/take-on aircraft 5.

Drogue-probe coupling assist system 7 also comprises a computing device 15, which is configured to receive distances A-B and A-C by means of a transceiver module 17, and to determine the distance B-C between the drogue and probe using a geometric calculation algorithm and on the basis of distances A-B and A-C.

In the FIG. 1 example, computing device 15 is preferably, though not necessarily, installed on tanker aircraft 2, and is designed to exchange information via transceiver module 17 with each of differential satellite positioning modules 9, 10, 11 over a communication system 16. In the example shown, transceiver modules 12, 13, 14, 17 may advantageously be radiofrequency transceiver devices for transmitting/receiving radiofrequency signals containing the info nation described above.

In connection with the above, it should be pointed out that, in an embodiment not shown, computing device 15, as opposed to being installed on tanker aircraft 2, may conveniently be installed in probe 6, or on take-on aircraft 5, or in drogue 4; and differential satellite positioning modules 9, 10, 11 may be installed on tanker aircraft 2, drogue 4, and probe 6 in any arrangement other than the one described. In other words, differential satellite positioning master module 9, i.e. the module calculating absolute position PA and differential correction C-RTK, may be installed on take-on aircraft 5, and differential satellite positioning modules 10 and 11 may be installed on tanker aircraft 2 and in drogue 4.

In one embodiment, differential satellite positioning master module 9 is installed in drogue 4, and differential satellite positioning modules 10 and 11 are installed on tanker aircraft 2 and take-on aircraft 5.

In connection with the above, it should be pointed out that, in each of the above three installation configurations of the differential satellite positioning master and slave modules on the tanker aircraft/drogue/take-on aircraft, computing device 15 receives two distances calculated by the two differential satellite positioning slave modules, and accordingly calculates the third distance using a calculation based on euclidean geometry.

Another important point to note is that using the DGPS/RTK satellite positioning devices described has the major advantage, unlike conventional GPS devices of roughly one meter precision, of obtaining distance measurements of roughly one centimeter precision, which is vital for automatically connecting probe 6 to drogue 4.

Figure 3:
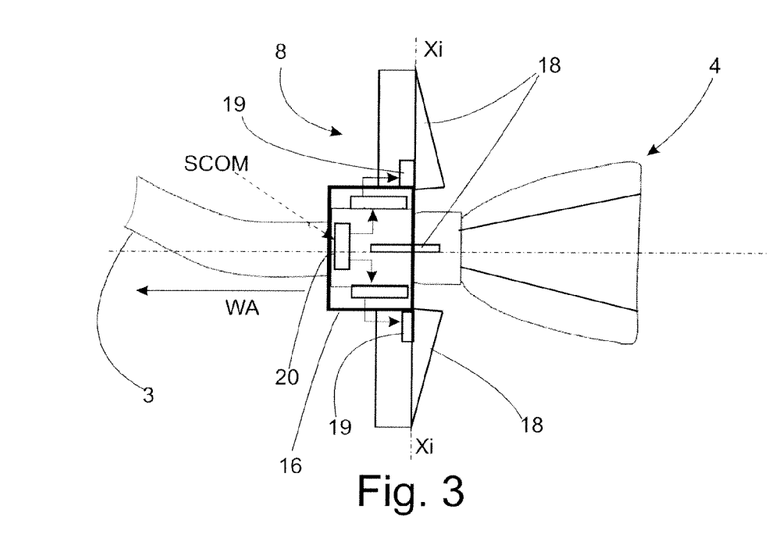
FIG. 3 shows a schematic, partly sectioned side view, with parts removed for clarity, of a drogue control assembly of the FIG. 1 system.
Figure 4:
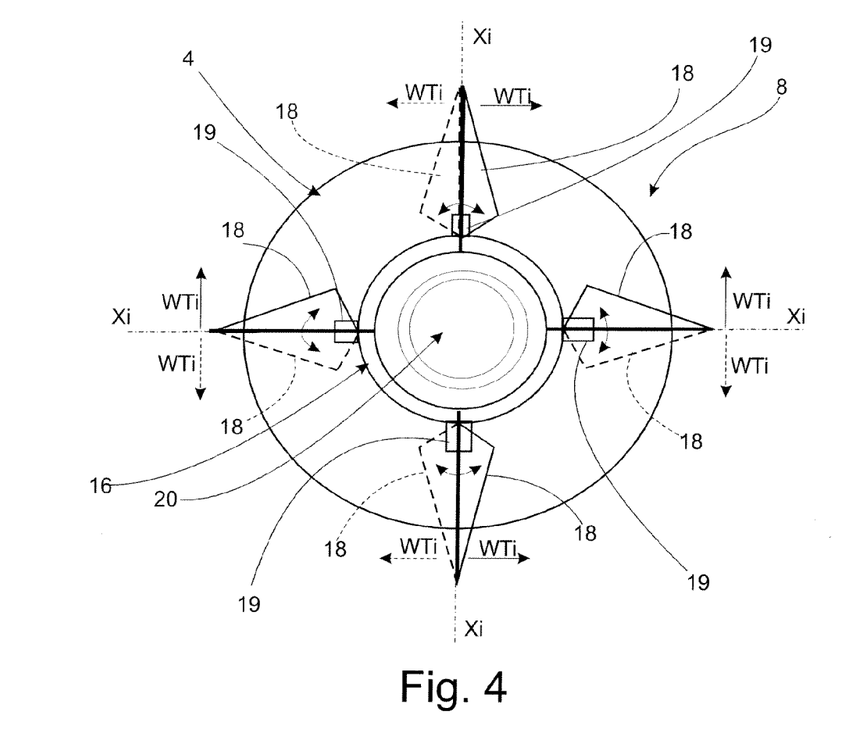
FIG. 4 shows a schematic, partly sectioned front view, with parts removed for clarity, of the FIG. 3 drogue control assembly.

In the FIGS. 3 and 4 embodiment, drogue control assembly 8 comprises a casing 16 which fits firmly to drogue 4 or to the end portion of hose 3 (as shown in FIG. 3); a number of deflecting fins 18, each extending radially from casing 16 and fitted to the casing to rotate about a respective axis of rotation Xi and generate, on drogue 4 in flight, a force WTi crosswise to axis of rotation Xi; and a number of actuators 19, each fitted firmly to casing 16 and to a fin 18 to rotate fin 18 about axis of rotation Xi.

More specifically, in the example shown schematically in FIGS. 3 and 4, casing 16 is substantially cylindrical and designed to fit firmly to the end portion of hose 3; and deflecting fins 18 project from casing 16 to form a substantially cross-shaped structure. Two horizontal fins 18 rotate about respective axes Xi to generate a crosswise force WTi by which to move drogue 4 up or down; and two vertical fins 18 rotate about respective axes Xi to generate a crosswise force WTi by which to move drogue 4 both ways in a substantially horizontal direction.

Drogue control assembly 8 also comprises an electronic control module 20, which is designed to receive a control signal SCOM via a transceiver module, and commands rotation of fins 18 by actuators 19 on the basis of control signal SCOM to move drogue 4.

In connection with the above, it should be pointed out that electronic control module 20 is preferably, though not necessarily, designed to control rotation of fins 18 on the basis of control signal SCOM and also on the basis of an acceleration signal from an inertial sensor (not shown), in particular a set of three accelerometers on drogue 4.

Computing device 15 in FIG. 2 is designed to continuously process drogue-probe distance B-C, and preferably heading H1 and speed V1 of drogue 4, heading H2 and speed V2 of probe 6, and heading HA and speed V2 of tanker aircraft 2, to determine the transverse (vertical/horizontal) movements of drogue 4 and/or take-on aircraft 5 necessary to align the respective longitudinal axes Z and Y of drogue 4 and probe 6.

More specifically, computing device 15 is supplied continuously by differential satellite positioning modules 9, 10, 11 with the above information relative to speeds VA, V1, V2, distances A-B, B-C, A-C, and headings HA, H1, H2, and processes it to generate control signal SCOM containing information relative to the necessary vertical/horizontal movement of drogue 4, and/or information relative to the necessary vertical/horizontal movement of take-on aircraft 5.

Accordingly, drogue-probe coupling assist system 7 may comprise a take-on aircraft autopilot system 21, which receives control signal SCOM and automatically controls take-on aircraft 5 to move it vertically and/or horizontally according to the movements contained in control signal SCOM.

In the FIG. 2 example, the take-on aircraft autopilot system 21 comprises a signal transceiver module 22 which receives control signal SCOM from computing device 15; a processing module 23 which receives control signal SCOM and accordingly determines the necessary movement of take-on aircraft 5; and a known aircraft autopilot device 24, which is supplied by processing module 23 with information relative to the necessary movement of aircraft 5, and pilots aircraft 5 to move it vertically and/or horizontally according to the information received.

Computing device 15 is also designed to generate, as a function of distance A-B, a first alarm signal AL1 containing distance A-B and indicating a first hazard situation caused by drogue 4 corning dangerously close to tanker aircraft 2.

For example, computing device 15 may be designed to generate first alarm signal AL1 when distance A-B falls below a first safety threshold representing the minimum safety distance between drogue 4 and tanker aircraft 2.

It should be pointed out that alarm signal AL1 may be generated not only to indicate a hazard situation, but also to indicate an improper position of drogue 4 with respect to tanker aircraft 2 and capable of damaging hose 3.

Computing device 15 is also designed to generate, as a function of distance A-C, a second alarm signal AL2 containing distance A-C and indicating a second hazard situation caused by take-on aircraft 5 coming dangerously close to tanker aircraft 2.

Computing device 15 may be designed to generate second alarm signal AL2 when distance A-C falls below a second safety threshold representing the minimum safety distance between take-on aircraft 5 and tanker aircraft 2.

Drogue-probe coupling assist system 7 also comprises one or more user interfaces 25, each designed to receive information relative to absolute position PA, drogue-probe distance B-C, and/or heading H1 and/or speed V1 of drogue 4, and/or heading H2 and/or speed V2 of probe 6/take-on aircraft 5, heading HA and speed VA of tanker aircraft 2, and to communicate this information to the pilot to assist the pilot in coupling the probe to the drogue.

Figure 5:
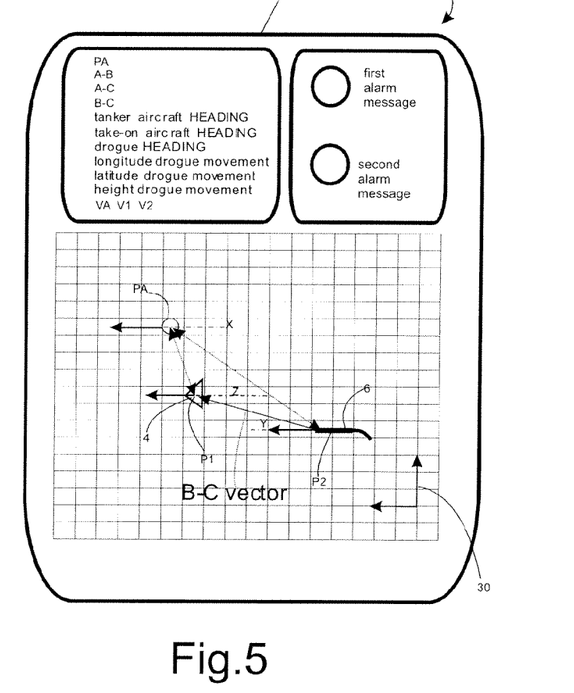
FIG. 5 shows a schematic of one example of a user interface of the FIG. 2 drogue-probe coupling assist system.

More specifically, in the FIG. 5 example, each user interface 25 comprises a screen or display 29, which provides the pilot with a continuous graphic display of: a predetermined, preferably, though not necessarily, two-dimensional reference system 30; position PA and the course/direction/heading of tanker aircraft 2; position P1 and the course/direction/heading of drogue 4; and position P2 and the course/direction/heading of probe 6 (take-on aircraft 5).

Each user interface 25 is also designed to continuously communicate to the pilot: speed VA of tanker aircraft 2, and/or speed V1 of drogue 4, and/or speed V2 of probe 6, and/or distances A-B, A-C and B-C.

Each user interface 25 is also designed to receive first alarm signal AL1 and/or second alarm signal AL2, and to generate an alarm message indicating the first and/or second hazard situation and/or measured distances A-B, A-C.

Accordingly, user interface 25 may comprise a device for producing audio or visual messages containing the information relative to the first and/or second alarm situation.

In the FIGS. 1 and 2 example, drogue-probe coupling assist system 7 comprises two user interfaces 25, one installed in the cockpit 26 of tanker aircraft 2 and designed to exchange information with differential satellite positioning master module 9, and the other installed in the cockpit 28 of take-on aircraft 5 and designed to exchange information with differential satellite positioning slave module 11.

Computing device 15 may also be designed to transmit first alarm signal AL1 and/or second alarm signal AL2; and autopilot system 21 may be designed to receive second alarm signal AL2 and control the movement of take-on aircraft 5 with respect to tanker aircraft 2 as a function of distance A-C in alarm signal AL2, to restore take-on aircraft 5 to a safe position with respect to tanker aircraft 2.

In one embodiment, electronic drogue control module 20 is designed to receive first alarm signal AL1, and commands control assembly 8 to move drogue 4 with respect to tanker aircraft 2 as a function of distance A-B in alarm signal AL1, and so restore drogue 4 to a safe position with respect to tanker aircraft 2.

An operating method implemented by assisted in-flight refueling system 1 as described above, and with the positioning module configuration shown in the FIG. 1 example, will now be described with reference to FIGS. 6, 7 and 8.

The operating method comprises a first step, in which tanker aircraft 2 moves in a straight line at constant speed, and take-on aircraft 5 begins approaching tanker aircraft 2 (block 100).

At this point, differential satellite positioning slave module 11 calculates and transmits distance A-C to computing device 15 (block 110), which determines, as a function of distance A-C, the presence or not of the second hazard situation caused by take-on aircraft 5 coming dangerously close to tanker aircraft 2 (block 120).

At this stage (block 120), computing device 15 performs the second-hazard-situation check and determines the presence of the second hazard situation when distance A-C, for example, is below the second safety threshold representing the minimum safety distance between tanker aircraft 2 and take-on aircraft 5 (YES output of block 120).

In the event the second hazard situation is determined, computing device 15 commands transmission of the second alarm signal AL2 (block 130).

The second alarm signal AL2 is sent to interfaces 25 and/or take-on aircraft autopilot system 21.

Interfaces 25 generate an alarm message to assist the pilots by alerting them to the hazard situation, and to enable the pilots to intervene manually to restore respective aircraft 2 and 5 to a distance greater than or equal to the minimum safety distance (block 140).

At this stage, autopilot system 21 may intervene independently, i.e. may pilot take-on aircraft 5 automatically as a function of second alarm signal AL2, to move it away from and back to a safe distance from tanker aircraft 2 (block 150).

Conversely, if no second hazard situation is determined during approach, the pilot proceeds to move take-on aircraft 5 into an optimum approach position.

This may be done manually, i.e. solely by the pilot, or fully automatically.

In manual control mode, the pilot of take-on aircraft 5 moves the aircraft into the optimum position by observing the positions of the two aircraft and/or the probe/drogue positions displayed on user interface 25 in cockpit 28.

Alternatively, in automatic mode, computing device 15 is designed to determine the best approach trajectory as a function of distance A-C and speeds VA of tanker aircraft 2 and V2 of take-on aircraft 5 measured by respective differential satellite positioning master and slave modules 9 and 11.

More specifically, computing device 15 is designed to continuously calculate, as a function of distance A-C and speeds VA and V2, the necessary movement/s and speed of take-on aircraft 5 to move it into the docking position, and transmits this information to autopilot system 21.

At this point, autopilot system 21 is therefore able to pilot aircraft 5 automatically as a function of the movement/speed information determined by computing device 15.

In the event aircraft 5 fails to move into the docking position (NO output of block 180), the method repeats the operations in blocks 110-160.

Conversely, in the event aircraft 5 succeeds in moving into the docking position (YES output of block 180), the method commences the drogue-probe coupling procedure.

At this point, differential satellite positioning slave module 10 determines and transmits distance A-B to computing device 15, which calculates distance B-C on the basis of distance A-B and the distance A-C determined and transmitted by differential satellite positioning slave module 11 (block 190).

At this point, computing device 15 determines, on the basis of distance A-B, the presence or not of the first hazard situation caused by drogue 4 coming dangerously close to tanker aircraft 2 (block 200).

At this stage, computing device 15 performs the first-hazard-situation check and determines the presence of the first hazard situation (YES output of block 200) when distance A-B, for example, is below the first safety threshold representing the minimum safety distance between the drogue and tanker aircraft 2.

In the event the first hazard situation is determined, computing device 15 transmits first alarm signal AL1 (block 210), which in this case is sent to interfaces 25 and/or electronic control module 20.

Interface 25 generates an alarm message to alert the pilot of tanker aircraft 2 to the hazard situation, and to enable the pilot to intervene to restore tanker aircraft 2 to a distance greater than or equal to the minimum safety distance from drogue 4 (block 220).

At this stage, electronic control module 20 of drogue control assembly 8 also controls drogue 4 automatically to move it away from tanker aircraft 2 to a distance greater than or equal to the safety distance (block 230). It should be pointed out that this is done as a function of distance A-B contained in first alarm signal AL1.

Conversely, in the event the first hazard situation is not determined, computing device 15 is supplied continuously by differential satellite positioning modules 9, 10, 11 with speed, distance, and heading information, and processes it to generate control signal SCOM containing information relative to the necessary vertical/horizontal movement of drogue 4 and/or information relative to the necessary vertical/horizontal movement of take-on aircraft 5 to achieve drogue-probe coupling.

In the example shown, this stage may preferably, though not necessarily, comprise transforming the distance B-C vector according to a first reference system containing latitude, longitude and altitude, into a distance B-C vector according to a UTM (Universal Transverse Mercatore) reference system (not shown).

The UTM reference system can be represented by a cartesian grid with three perpendicular axes, in which the x axis UTME (not shown) extends in an East-West land direction, the y axis UTMN (not shown) extends in a North-South land direction and defines a plane UTMEN (not shown) with the x axis UTME (not shown), and the third axis UTMZ (not shown) is associated with the vertical coordinates, i.e. directly with height.

Assuming the third component is zero, i.e. axis Y of probe 6 and drogue axis Z are both at the same height, computing device 15 can transform the distance B-C vector according to the first reference system into a distance B-C vector according to the UTM reference system, and can then rotate the B-C vector in plane UTMNE by an angle equal to heading H2 of take-on aircraft 5, to obtain a transverse component and a longitudinal component of vector B-C with respect to the direction of take-on aircraft 5 (block 240).

The transverse and longitudinal components of vector B-C so obtained represent information relative to the movement to be coded in control signal SCOM (block 250).

At this point, computing device 15 transmits control signal SCOM to electronic control module 20 (block 260), which controls the movement of drogue 4, by means of actuators 19, as a function of the movements contained in control signal SCOM (block 280).

In one embodiment, control signal SCOM is sent to autopilot system 21, which moves aircraft 5 automatically on the basis of the movements contained in control signal SCOM (block 270).

At this point, computing device 15 determines, as a function of distance B-C, whether respective longitudinal axes Z and Y of the drogue and probe 6 are aligned (block 290).

If they are not (NO output of block 290), the method repeats the operations in blocks 190-280; conversely, if longitudinal axes Z and Y are aligned, computing device 15 transmits a signal containing information indicating drogue-probe alignment, and authorizing take-on aircraft 5 to approach drogue 4. More specifically, this signal is sent to user interface 25, which generates a message informing the pilot of drogue-probe alignment, and requesting the pilot to move aircraft 5 towards drogue 4.

At this point, the pilot moves take-on aircraft 5 forward in a straight line to insert probe 6 inside drogue 4 (block 300).

In one embodiment, once axes Z and Y are aligned, computing device 15 determines, as a function of speeds VA, V1, V2 and distance B-C, the necessary adjustments to speed V2 of the take-on aircraft to achieve drogue-probe coupling (block 310).

At this stage, computing device 15 transmits a signal SCA, containing commands to adjust speed V2, to autopilot system 21, which proceeds to move aircraft 5 forward fully automatically, making the speed adjustments contained in signal SCA.

Obviously, if drogue 4 and probe 6 are perfectly aligned, and speeds V1, V2 and headings H1, H2 of the drogue and probe correspond, drogue-probe coupling may be completed solely on the basis of distance B-C.

Computing device 15 determines successful drogue-probe coupling when distance B-C is zero (block 320).

If coupling is not achieved (NO output of block 320), the method repeats the operations in blocks 310-320.

Once drogue-probe coupling is achieved (YES output of block 320), computing device 15 commands refueling (block 330) and, once refueling is completed (YES output of block 340), commands release of the drogue and probe by supplying user interfaces 25 with a signal containing information indicating refueling is completed, and a request to release the drogue and probe and distance the two aircraft.

Figure 8:
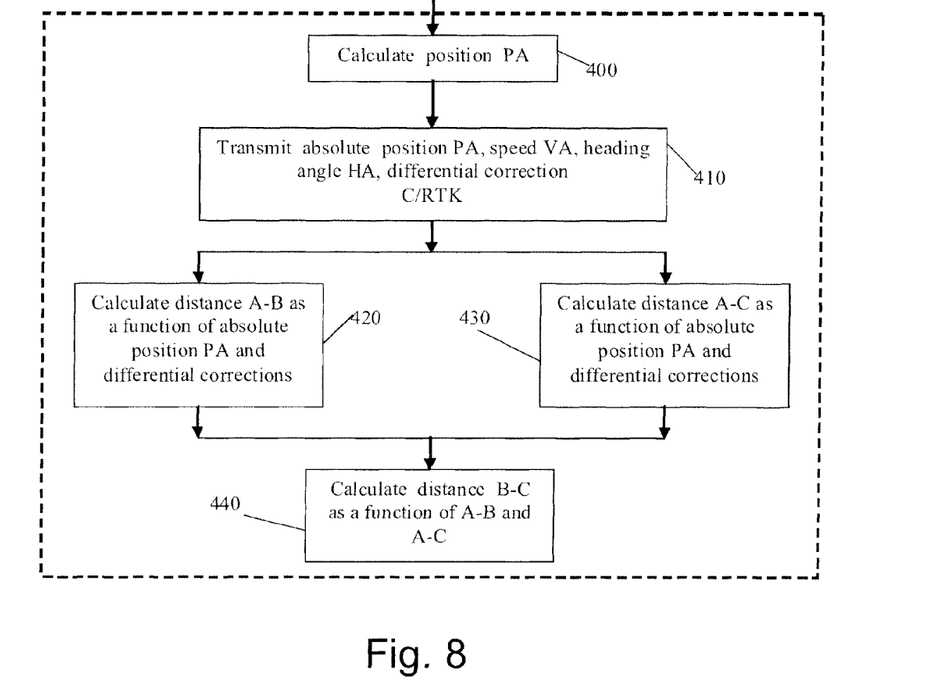
FIG. 8 shows a flow chart of the differential distance calculations performed by the drogue-probe coupling assist system.

With reference to FIG. 8, distances A-B, A-C, B-C are calculated continuously by system 7 described above, substantially by the DGPS/RTK satellite positioning device of differential satellite positioning master module 9 determining its own absolute position PA in space in terms of latitude, longitude and altitude, and implementing the RTK algorithm, which determines differential correction C-RTK related to the intrinsic error in the PA measurement by the GPS satellite system (block 400).

Differential satellite positioning master module 9 then transmits absolute position PA and differential correction C-RTK to differential satellite positioning slave modules 10 and 11 (block 410).

On receiving the information transmitted by differential satellite positioning master module 9, differential satellite positioning slave module 11 determines distance A-C as a function of its own position with respect to position PA and on the basis of differential corrections C-RTK, and transmits distance A-C to computing device 15 (block 430).

On receiving the information transmitted by differential satellite positioning master module 9, differential satellite positioning slave module 10 determines distance A-B as a function of its own position with respect to position PA and on the basis of differential corrections C-RTK, and transmits distance A-B to computing device 15 (block 420).

At this point, computing device 15 calculates distance B-C by means of a euclidean geometric calculation on the basis of distances A-C and A-B (block 440).

The in-flight refueling system described has the following advantages.

First and foremost, using DGPS/RTK satellite positioning devices gives a distance measuring precision of roughly a centimeter by which to achieve drogue-probe coupling, unlike conventional GPS satellite systems with a measuring precision of several meters.

The system greatly reduces the work load on the pilots at the drogue-probe coupling stage. In fact, even in the simplest solution, in which take-on aircraft approach is performed manually, the pilot can control the take-on aircraft on the basis of the positions displayed on the user interface, with no need to keep track of the position of the tanker aircraft and/or drogue outside the cockpit. In other words, the pilot has the advantage of being able to control approach by simply concentrating on the graphic position information displayed on the user interface, regardless of weather conditions, and even at night.

The variation featuring automatic take-on aircraft approach and/or automatic drogue-probe coupling on the basis of the movements determined by the computing device obviously not only greatly reduces pilot stress, but also enables refueling to be completed within a predetermined time, regardless of weather conditions.

The system described therefore has the advantage of being able to preprogram in-flight refueling of a given number of aircraft, while at the same time drastically reducing the risk of refueling failure.

Clearly, changes may be made to the system described without, however, departing from the scope of the present invention as defined in the accompanying Claims.

Figure 9:
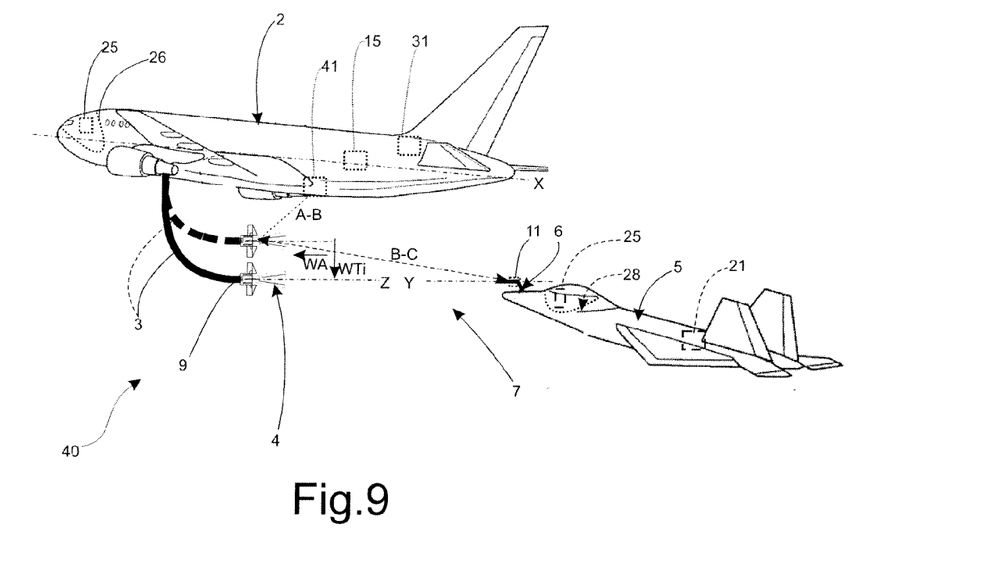
FIGS. 9 and 10 show schematics of two variations of the assisted in-flight refueling system.

More specifically, the FIG. 9 embodiment relates to an in-flight refueling system 40 similar to in-flight refueling system 1, and the component parts of which are indicated, where possible, using the same reference numbers as for the corresponding parts of system 1.

Refuelling system 40 differs from refueling system 1 by a differential satellite positioning slave module of drogue-probe coupling assist system 7 being replaced with a measuring device 41 for measuring distance A-B between tanker aircraft 2 and drogue 4.

More specifically, measuring device 41 may be a known optoelectronic laser device, not described in detail, or any other similar electronic device for measuring the distance between two objects.

In the FIG. 9 embodiment, differential satellite positioning master module 9 is mounted directly on drogue 4, and differential satellite positioning slave module 11 is mounted on take-on aircraft 5.

Figure 6:
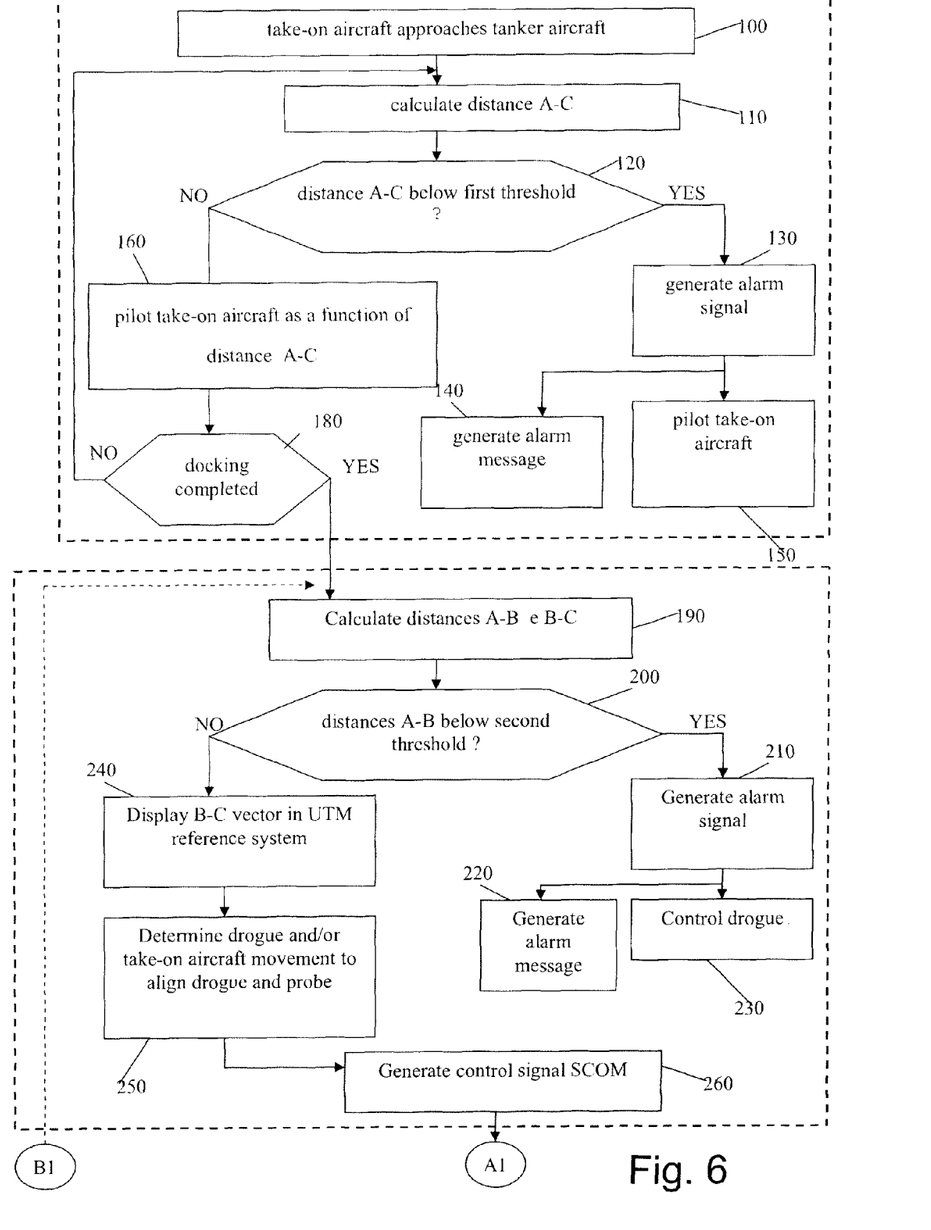
FIGS. 6 and 7 show a flow chart of the drogue-probe coupling operations performed by the FIG. 1 assisted in-flight refueling system.
Figure 7:
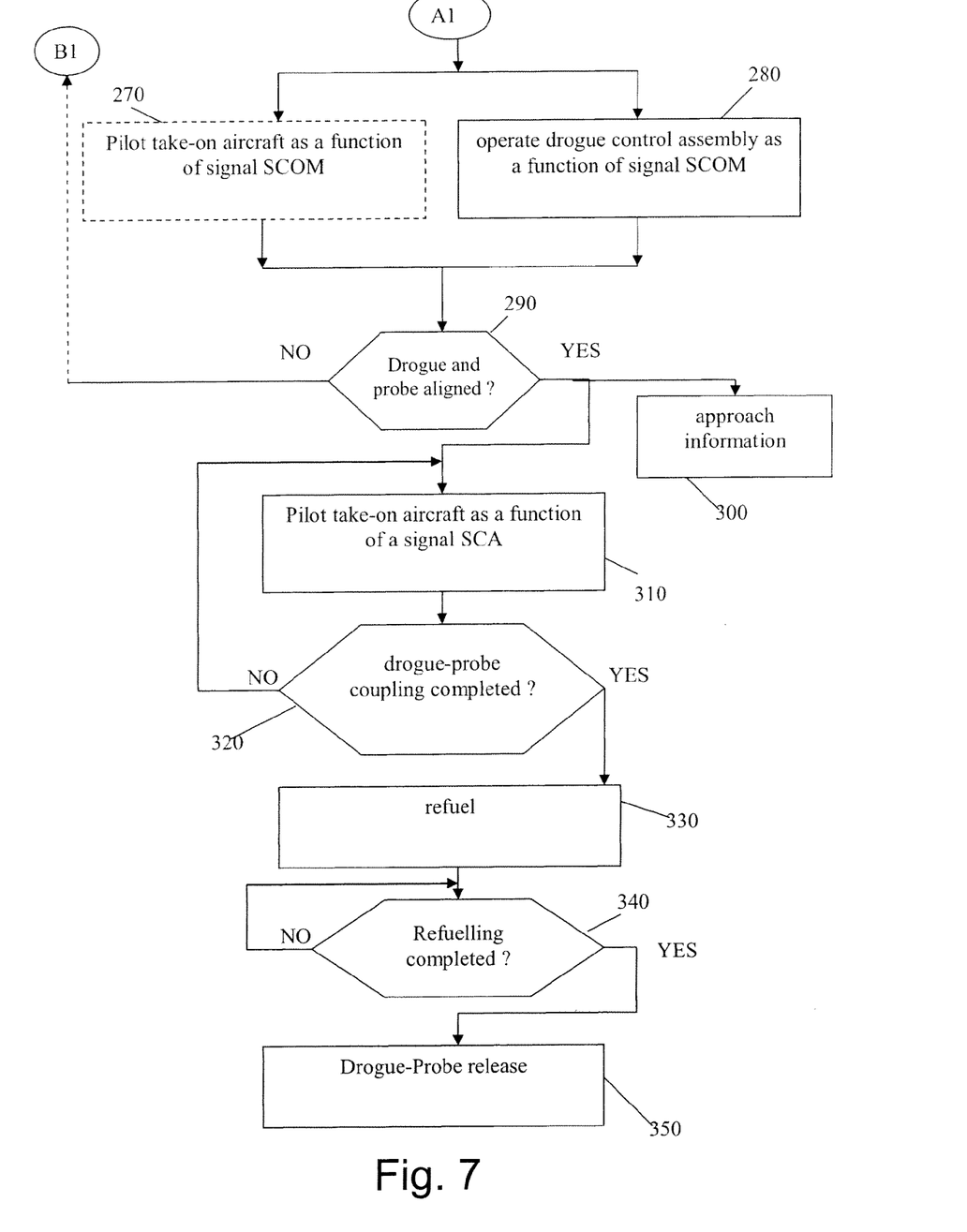

In this case, distance B-C is determined directly by differential satellite positioning slave module 11 on take-on aircraft 5; distance A-B is measured by measuring device 41; distance A-C is determined by computing device 15 as a function of distances B-C and A-B; and drogue-probe coupling assist system 7 provides for coupling drogue 4 and probe 6, as described in the FIGS. 6, 7 and 8 flow charts, on the basis of distances A-B, B-C and A-C.

Obviously, differential satellite positioning master module 9 may be mounted directly on take-on aircraft 5, and differential satellite positioning slave module 11 may be mounted in drogue 4.

Figure 10:
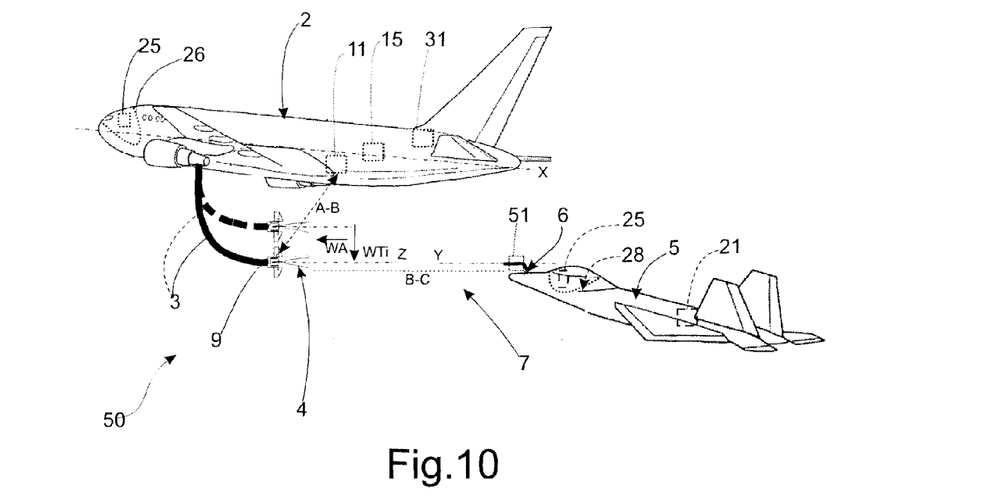

The FIG. 10 embodiment relates to an assisted in-flight refueling system 50 similar to in-flight refueling system 1, and the component parts of which are indicated, where possible, using the same reference numbers as for the corresponding parts of system 1.

Assisted in-flight refueling system 50 differs from assisted refueling system 1 by a differential satellite positioning slave module of drogue-probe coupling assist system 7 being replaced with a measuring device 51 for measuring distance B-C between take-on aircraft 5 and drogue 4.

More specifically, measuring device 51 may be a known optoelectronic laser device, not described in detail, or any other similar electronic device for measuring the distance between the object on which it is installed and another object.

In the FIG. 10 embodiment, differential satellite positioning master module 9 is mounted on tanker aircraft 2, and differential satellite positioning slave module 10 is mounted directly on drogue 4.

In this case, distance B-C is determined directly by measuring device 51 mounted on take-on aircraft 5; distance A-B is measured by differential satellite positioning master module 9; distance A-C is determined by computing device 15 as a function of distances B-C and A-B; and drogue-probe coupling assist system 7 provides for coupling drogue 4 and probe 6 using the same control procedure described in the FIGS. 6, 7 and 8 flow charts, on the basis of distances A-B, B-C and A-C.

In a variation not shown, assisted in-flight refueling system 1 comprises a number of take-on aircraft 5, each comprising a DGPS/RTK positioning module 11.

Computing device 15 of drogue-probe coupling assist system 7 is designed to continuously determine the relative speed between each take-on aircraft 5 and tanker aircraft 2 on the basis of the information generated by the respective positioning module 11.

Computing device 15 also determines distance A-C between each take-on aircraft 5 and tanker aircraft 2, so as to determine the direction of each take-on aircraft 5 as a function of distance A-C and the relative speed between take-on aircraft 5 and tanker aircraft 2.

Computing device 15 informs the pilot of tanker aircraft 2, over user interface 25 on tanker aircraft 2, of the position and travelling direction of each take-on aircraft 5 with respect to tanker aircraft 2.

Computing device 15 may also be designed to inform the pilot of each take-on aircraft 5, over respective user interface 25, of the position and travelling direction of each take-on aircraft 5 with respect to tanker aircraft 2.

The invention claimed is:

1. An assisted in-flight refueling system for a fuel take-on aircraft comprising a rigid probe; said assisted in-flight refueling system comprising a tanker aircraft, and a drogue connected to said tanker aircraft by a flexible hose and drawn by said tanker aircraft in a predetermined travelling direction, said drogue being fitted to an end portion of said flexible hose;
    said assisted in-flight refueling system comprising an electronic flight control system including:
    first, second, and third DGPS/RTK positioning modules installed respectively on said drogue, said take-on aircraft, and said tanker aircraft to determine a first quantity indicating a first distance between said drogue and said probe; a second quantity indicating a second distance between said tanker aircraft and said drogue; and a third quantity indicating a third distance between said tanker aircraft and said probe; said first DGPS/RTK positioning module being a master module configured to determine an absolute position, speed, and heading, and said second and third DGPS/RTK positioning modules being slave modules configured to determine relative distance to the master module, said second and third DGPS/RTK positioning modules transmitting relative position, distance, speed, and heading angle to said first DGPS/RTK positioning module; and
    an electronic control means designed to cooperate with said three positioning modules to determine, as a function of said first distance, the necessary movement of said drogue to couple said drogue to said probe, said electronic control means being continuously supplied with information from said first, second, and third DGPS/RTK positioning modules,
    wherein said electronic flight control system comprises a control means mounted on said drogue to move said drogue in one or more transverse directions crosswise to said travelling direction, said electronic control means being designed to control said control means as a function of said first distance, so as to move said drogue in one or more transverse directions crosswise to said travelling direction, and to align the longitudinal axis of said drogue with the longitudinal axis of said probe based on said first distance between said drogue and said probe, said electronic control means continuously processing said first distance between said drogue and said probe and continuously determining control means movements necessary to align the longitudinal axis of said drogue with the longitudinal axis of said probe, and
    wherein the control means includes a casing attached to said drogue at the end portion of said flexible hose, a plurality of deflecting fins extending radially from said casing, and a plurality of actuators, which move said deflecting fins.

2. An assisted in-flight refueling system as claimed in claim 1, wherein said electronic flight control system comprises electronic automatic control means installed on the take-on aircraft and designed to automatically pilot said take-on aircraft as a function of said first, second, and third distance, to align said probe with said drogue.

3. An assisted in-flight refueling system as claimed in claim 1, wherein said electronic flight control system comprises at least one user interface installed on said tanker aircraft and/or said take-on aircraft; said user interface being designed to provide the user with the instantaneous position of said tanker aircraft, and/or the instantaneous position of said drogue, and/or the instantaneous position of said take-on aircraft as a function of said first, second, and third distance.

4. An assisted in-flight refueling system as claimed in claim 1, wherein said electronic flight control system is designed to determine a hazard situation and generate a first alarm signal, indicating said take-on aircraft coming dangerously close to said tanker aircraft, when said third distance is below a predetermined first threshold.

5. An assisted in-flight refueling system as claimed in claim 4, wherein said electronic control means are designed to cooperate with said electronic automatic control means to move said take-on aircraft to a distance greater than or equal to a predetermined safety distance from said tanker aircraft as a function of said first alarm signal.

6. An assisted in-flight refueling system as claimed in claim 3, wherein, on receiving said first alarm signal, each said user interface is designed to send the pilot an alarm message indicating said take-on aircraft coming dangerously close to said tanker aircraft.

7. An assisted in-flight refueling system as claimed in claim 3, wherein said electronic flight control system is designed to generate a second alarm signal, indicating said drogue coming dangerously close to said tanker aircraft, when said second distance is below a predetermined second threshold.

8. An assisted in-flight refueling system as claimed in claim 7, wherein said electronic control means are designed to cooperate with said electronic automatic control means to move said drogue automatically in said transverse directions, by means of said control means, to a distance greater than or equal to a predetermined safety distance from said tanker aircraft as a function of said second alarm signal.

9. An assisted in-flight refueling system as claimed in claim 3, wherein said user interfaces are designed to receive said second alarm signal and supply the pilot with an alarm message indicating said drogue coming dangerously close to said tanker aircraft.

10. An assisted in-flight refueling system for a fuel take-on aircraft comprising a rigid probe; the assisted in-flight refueling system comprising a tanker aircraft, and a drogue connected to the tanker aircraft by a flexible hose and drawn by the tanker aircraft in a predetermined travelling direction, the drogue being connected to an end portion of the flexible hose;
the assisted in-flight refueling system comprising an electronic flight control system, which comprises a control means mounted on the drogue to move the drogue in one or more transverse directions crosswise to the travelling direction, and is designed to:
cooperate with a first DGPS/RTK positioning module mounted on the drogue, a second DGPS/RTK positioning module mounted on the tanker aircraft, and a third DGPS/RTK module mounted on the probe; the first DGPS/RTK positioning module being configured to determine a first quantity indicating a first distance between the drogue and the probe; the second DGPS/RTK positioning module being configured to determine a second quantity indicating a second distance between the tanker aircraft and the drogue; and the third DGPS/RTK positioning module being configured to determine a third quantity indicating a third distance between the tanker aircraft and the probe;
supply information indicating the necessary movement of the take-on aircraft to move it into a predetermined docking position, as a function of the third distance, the speed of the tanker aircraft, and the speed of the take-on aircraft;
operate the control means, once the take-on aircraft is in the predetermined docking position, to move the drogue in one or more transverse directions crosswise to the travelling direction, to align a longitudinal axis of the drogue with a longitudinal axis of the probe based on the first distance between the probe and the drogue and the electronic flight control system continuously determining control means movements necessary to align the longitudinal axis of the drogue with the longitudinal axis of the probe; and
once the drogue is aligned with the probe, supply information indicating the necessary straight-line movement of the take-on aircraft towards the drogue, as a function of the first distance, to couple the probe to the drogue,
wherein the control means includes a casing attached to the drogue at the end portion of the flexible hose and a plurality of deflecting fins extending radially from the casing.

11. An assisted in-flight refueling system as claimed in claim 10, wherein said electronic flight control system comprises three DGPS/RTK positioning modules installed respectively on said drogue, said take-on aircraft, and said tanker aircraft to determine said first, second, and third distance.

12. An assisted in-flight refueling system as claimed in claim 11, wherein said electronic flight control system comprises a user interface installed on said take-on aircraft and designed to supply information to assist the pilot in manoeuvring the take-on aircraft into the docking position and/or manoeuvring the take-on aircraft to couple the probe to the drogue.

13. An assisted in-flight refueling system as claimed in claim 11, wherein said electronic flight control system comprises electronic automatic control means installed on the take-on aircraft and designed to pilot the take-on aircraft automatically on the basis of said information for manoeuvring the take-on aircraft into said docking position and/or the drogue-probe coupling position.

14. An assisted in-flight refueling system as claimed in claim 11, and comprising a number of take-on aircraft, each comprising a DGPS/RTK positioning module; said electronic flight control system being designed to continuously determine the relative speed of each take-on aircraft with respect to said tanker aircraft, and the third distance between each take-on aircraft and the tanker aircraft.

15. An assisted in-flight refueling system as claimed in claim 14, wherein said electronic flight control system comprises a number of user interfaces installed respectively on said tanker aircraft and each take-on aircraft;
said electronic flight control system being designed to:
determine the position and/or travelling direction of each take-on aircraft as a function of the third distance and said relative speed;
inform the pilot, over the user interface installed on the tanker aircraft, the position and/or travelling direction of each take-on aircraft with respect to said tanker aircraft; and/or
inform the pilot, over the user interface installed on each take-on aircraft, the position and/or travelling direction of each take-on aircraft with respect to said tanker aircraft.

16. An assisted in-flight refueling system as claimed in claim 1, wherein a first DGPS/RTK positioning module is a master module configured to determine an absolute position and wherein a second and third DGPS/RTK module are slave modules configured to determine a distance with respect to the master module.

17. An assisted in-flight refueling system as claimed in claim 16, wherein one of the second and third DGPS/RTK modules is configured to transmit a relative position, a distance to the master module, a speed, and a heading angle.

18. An assisted in-flight refueling system as claimed in claim 10, wherein the plurality of deflecting fins includes a first pair of deflecting fins having a first rotational axis and a second pair of deflecting fins having a second rotational axis that is not parallel to the first rotational axis.

19. An assisted in-flight refueling system as claimed in claim 18, wherein the first rotational axis and the second rotational axis are orthogonal to one another.

20. An assisted in-flight refueling system as claimed in claim 1, wherein an end of the flexible hose is positioned substantially parallel to a longitudinal axis of the tanker aircraft when the flexible hose is extended in flight.

21. An assisted in-flight refueling system as claimed in claim 1, wherein the plurality of fins form a cross-shaped structure.

* * * * *